Figures 1, 2:
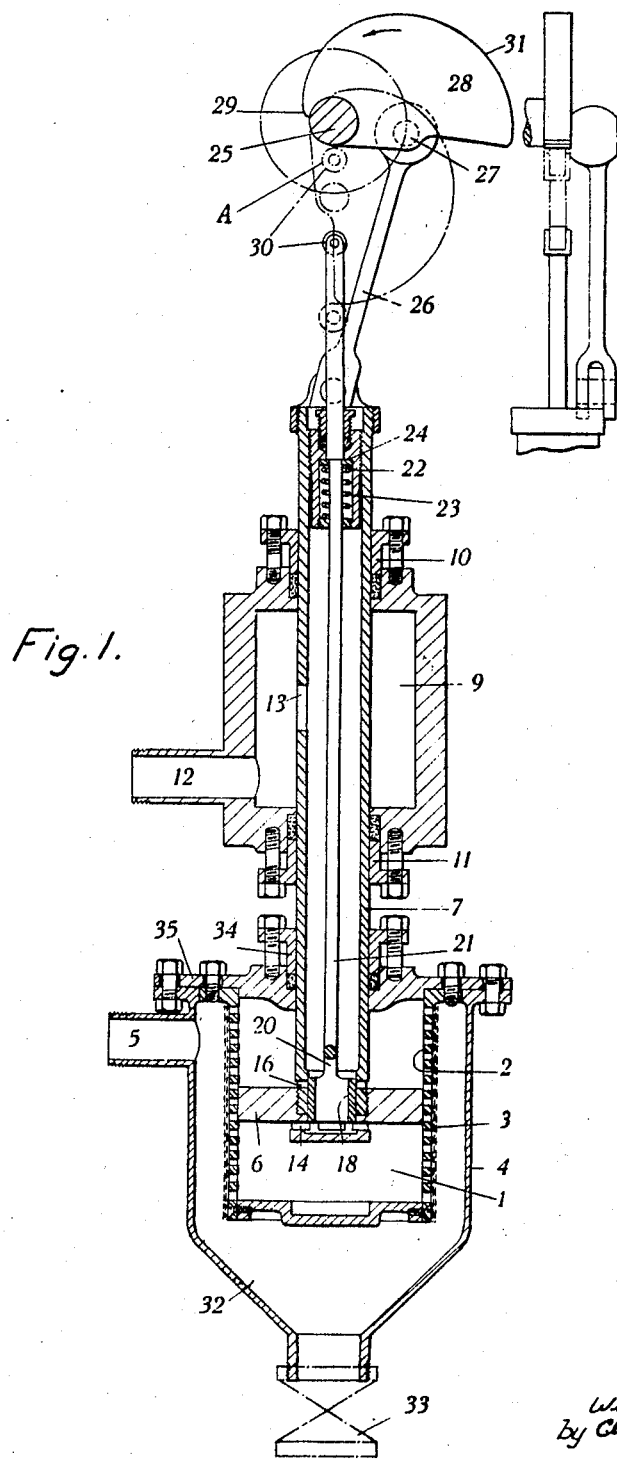

Jan. 4, 1944.  W. J. FORREST ET AL  2,338,418

FILTERING AND LIKE TREATMENT OF FLUIDS

Filed Feb. 21, 1940

Inventors
William James Forrest
By Charles Hall Brown
Albert F. Nathan
Attorney

Patented Jan. 4, 1944

2,338,418

UNITED STATES PATENT OFFICE 2,338,418

FILTERING AND LIKE TREATMENT OF FLUIDS

William James Forrest, Ilford, and Charles Hall Brown, Catford, London, England

Application February 21, 1940, Serial No. 320,017
In Great Britain June 9, 1939

11 Claims. (Cl. 210—167)

The present invention relates to the filtering or straining of fluids, more especially to obtain a clean liquid filtrate from liquids, e. g., viscous liquids such as oils, paints, varnishes or other liquids containing pigments, powders, crystals or other solid matter in suspension in a finely divided state, but it can be used for the filtering or straining of other liquids or of dust-laden or powder-containing gases, vapours or the like. The passing of some liquids, such as varnishes and oils, through separating surfaces is sometimes termed "refining" and it is to be understood that the term "filtering" used herein is intended to cover such treatments. In the following description, the filtering or straining means which may be gauze (e. g., of metal), silk, cloth, paper, washleather or other material or may be slots or the like produced by finely spaced plates or coiled wires or by other suitable means is termed filtering medium.

The object of the present invention is to provide an improved method of effecting the filtration and of cleaning the filtering medium. The invention further aims at facilitating the separation of the dross, i. e., the particles held back by the filtering medium, whilst avoiding waste of, or the introduction of foreign materials into, the liquid being treated, and at effecting these objects in such a way that the apparatus and filtering medium are protected as far as possible from injury and the filtration can proceed continuously whilst the filtering medium is being cleaned.

The improved filtering or straining apparatus according to the present invention comprises a reciprocating plunger arranged to work in a filtrate chamber and valve means for periodically opening and closing to the delivery outlet of the apparatus the variable compartments formed in the chamber on each side of the plunger when the plunger is in motion, and is characterised by the provision of valve actuating means for periodically moving the valves to close that compartment which was previously open and to open that which was previously closed, these movements being timed to occur when the plunger is at or near the end or the beginning of a stroke so that at or about the commencement of the stroke of the plunger the compartment in front of the plunger is closed and that which is behind the plunger, or is formed behind the plunger as the latter moves, is opened to enable the plunger to force filtrate in front of it through the filtering medium for cleaning the latter whilst fluid is passing in the reverse direction into the chamber behind the plunger and is being delivered from the apparatus, the plunger thereby being effective over the whole or a great part of its stroke in effecting cleansing action whilst the filtration is proceeding.

The whole of the filtering medium can therefore be effectively cleaned whilst the filtration is proceeding. If the filter is only cleaned periodically, e. g., by hand, the whole or substantially the whole of the filtering surface can be made effective for normal filtering, but the continuous automatic operation of cleaning is an important result which can be achieved by the apparatus. The valves and the parts they open or close may move with the plunger, the periodic movements of the valves being however made relatively to the plunger. The valves may be formed by a single member.

In one preferred form of the apparatus the plunger is on a hollow rod having openings to place the interior of the rod alternately into communication with each side of the plunger and the valves are arranged to close the opening on the pressure side of the plunger whilst the opening on the suction side of the plunger is open. The valves may be in the form of a sleeve member carried by a rod passing through the hollow plunger rod.

The plunger rod may be driven by a crank or eccentric. Cam means serve well for operating the valves for suddenly closing one opening and opening the other in the hollow plunger rod when the plunger has reached or nearly reached the end of each stroke or has just commenced a fresh stroke and the cam may conveniently be mounted on the crank shaft or pin. Spring means may be employed to return the rod for operating the valves in the reverse direction.

The cam may be in the form of a peripheral cam provided with a quick acting portion to move the rod suddenly in order to operate the valves when the plunger is at or about the end of one stroke or is commencing another and the cam may have a following peripheral portion for maintaining the rod depressed until the plunger is at or about the end of the next stroke or is commencing a third.

The hollow plunger rod may be provided with another opening and around this apertured portion of the rod a chamber is formed and appropriately sealed off with the rod so that fluid which passes up the rod may escape through the opening into such surrounding chamber and thence pass to discharge.

The filtering medium and the filtrate chamber may be located in a receiver for the crude material and the latter so constructed and arranged as to permit dross forced off the filtering medium to settle by gravity out of the crude material in the receiver. Where the dross is heavier than the liquid, the receiver may be provided with a sump, e. g., of funnel shape, preferably valve-controlled, so that the dross can be drawn off from the bottom of the receiver, if desired without stopping the process of filtration. If the dross is lighter than the liquid it may be collected from the top.

The crude material may be fed to the receiver by gravity or may be pumped into the receiver and if sufficient pressure is not available by such means to drive the filtrate up the plunger rod into the upper chamber for discharge, the latter chamber may be subjected continuously or intermittently to partial vacuum. If desired, instead of providing a receiver for the crude material the filtering medium and the filtrate chamber can be submerged in a bulk of liquid to be filtered.

The invention enables the filtering medium to be cleaned and the plunger rod to operate without the risk of any dross obtaining access to the glanded joint of the plunger rod with the wall of the filtrate chamber through which the rod passes, or to any other joint between moving parts involved in the process of filtering and cleaning.

In order that the present invention may be the more readily understood reference is hereinafter made to the accompanying drawing, in which Fig. 1 shows one form of apparatus according to the invention in vertical section and Fig. 2 is a side view of the upper part of Fig. 1.

In the drawing the filtrate chamber 1 is formed by a cylindrical drum 2 having a perforated wall around which is wrapped the filtering medium 3. The drum is located in a receiver 4 to which crude material to be filtered is led, e. g., under the pressure of gravity or pump. The inlet for the crude material to the receiver is marked 5.

In the filtrate chamber 1 is arranged a plunger 6 which is fast with a hollow plunger rod 7. The hollow plunger rod is provided with an opening 14 which is adapted to place the interior of the rod in communication with the filtrate chamber on one side of the plunger 6 and an opening 16 serves to place the interior of the rod in communication with the filtrate chamber on the opposite side of the plunger. These openings are controlled by valves which are shown as a single sleeve 18 (hereinafter termed the sleeve valve) which is connected by way of spiders 20 with a rod 21 which is mounted to slide in the hollow plunger rod. The valve rod 21 is provided with a collar 22 which is urged by a spring 23 against a shoulder 24 in the interior of the hollow plunger rod, the spring thereby normally tending to hold the sleeve valve in the position shown in the drawing.

The plunger rod is operated by a crank shaft 25 by connection through a connection rod 26 with crank pin 27, and mounted on the crank shaft is a cam 28 having a steep cam portion 29. The valve rod is provided with a cam follower 30 at its upper end.

Around the plunger rod is a chamber 9 which is sealed off with the rod by stuffing boxes 10, 11 and is provided with an outlet 12. The rod is provided with an aperture 13 which places the interior of the rod in communication with the chamber 9.

In the drawing the plunger is shown in a mid-position with the plunger rod rising. Filtered material is entering below the plunger 6 and passes from the filtrate chamber through opening 14 up the hollow rod, some part of it flowing through the aperture 13 into the chamber 9. Meanwhile the opening 16 is kept closed by the sleeve valve. When the plunger is at or near the end of its upward stroke and the cam roller has reached its top position A, the steep portion 29 of the cam has come to the roller, with the result that the cam portion 29 suddenly moves the rod downwards with reference to the hollow plunger rod and thereby causes the sleeve valve to close opening 14 and open opening 16. Consequently on the downward stroke of the plunger filtrate which has been collected during the previous upward stroke in the filtrate chamber is forced out in the reverse direction through the filtering medium in order to cleanse the latter. During this time filtered material is now passing into the filtrate chamber on the upper side of the plunger 6 and through opening 16 and is escaping through the aperture 13 into the chamber 9. When the cam portion has depressed the sleeve valve the cam roller 30 follows the peripheral portion 31 of the cam, such latter portion being so designed as to keep the valve rod depressed until the plunger has about reached the end of its downward stroke. The cam having then reached the position shown in dotted lines soon allows the spring to lift the valve rod with reference to the plunger rod and return the sleeve valve into the position shown in the drawing so that a fresh charge of filtrate is then drawn in below the plunger whilst filtrate drawn in during the previous stroke is now forced in the reverse direction through the filtering medium for cleaning.

Dross forced off the filtering medium separates out by gravity from the crude material in the receiver and collects in the sump 32 which may be valve controlled and the valve 33 may be periodically opened to allow the collected dross to flow away, for example into a receptacle placed below the receiver.

The crude material may be delivered to the receiver by gravity or under pressure, e. g., of a pump and/or the chamber 9 may be continuously or intermittently under partial vacuum.

The crank and cam are so designed that when the plunger is in the mid-position the crank pin lies below the horizontal plane through the crank shaft axis so as to allow the plunger to rise and fall from the mid-position to the same extent.

The upper part of the space in the hollow plunger rod serves as a relief and cushioning device, air trapped in this chamber acting in the manner of an air spring.

The drawing shows the crank arrangement diagrammatically and if desired two connecting rods could be provided in order to provide a more balanced arrangement.

Any suitable means such as a key and key-way may be provided to restrain the valve rod from rotation.

The invention enables the filtering medium to be kept fixed and for the hollow plunger rod to work in a packed joint 34 in the top wall 35 of the filtrate chamber so that there is no risk of dross obtaining access to the joint and affecting the efficiency of the apparatus.

The speed of reciprocation of the plunger may be varied according to the material under treatment and according to the rate of flow of fluid through the filtering medium. The crank shaft could be driven from a motor through any suitable gearing which may be variable to regulate the speed of reciprocation of the plunger.

If desired the chamber 9 and the filtrate chamber could be separated by a common wall.

What we claim is:

1. A filtering or straining apparatus comprising a hollow cylinder having end walls, a cylindrical filtering wall forming the inlet to the cylinder, means for causing the fluid under treatment to flow through said wall, a plunger in said cylinder and a hollow rod forming with said plunger a reciprocatable unit, said rod extending through one of said end walls, means for reciprocating said unit and thereby displacing said plunger along said filtering wall, said unit having openings communicating with the interior of the rod and the cylinder on either side of the plunger for permitting filtrate to pass into the hollow rod from said cylinder, said portion of the rod which works outside the cylinder having an outlet for filtrate from the interior of the rod, valve means movable with said plunger in such disposition in relation thereto as to close the opening which communicates with the rod interior and the front of the moving plunger so that filtrate in that part of the cylinder is forced back through the filtering wall while filtrate in the cylinder behind the plunger enters the rod through the uncovered opening, and means for displacing said valve means relatively to the plunger so as to uncover the opening which was previously closed and to close that which was previously open, said valve-displacing means being operatively co-ordinated with said plunger displacing means so as to effect the said valve movement when the plunger is about at the point of reversal of its movement.

2. A filtering or straining apparatus comprising a hollow body forming a filtrate chamber having end walls and a filtering wall between said end walls forming the inlet to the chamber, means for causing the fluid under treatment to flow through said wall, a unit comprising a plunger in said chamber and a hollow rod carrying said plunger and extending through one of said end walls, means for reciprocating said unit and thereby displacing said plunger along said filtering wall, said unit having openings communicating with the interior of the rod and the chamber on either side of the plunger, said openings permitting filtrate to flow into the hollow rod from said chamber, said portion of the rod which works outside the chamber having an outlet for the passage of filtrate from the interior of the rod, a rod within said hollow plunger rod and carrying valve means co-operating with said openings, said valve means and rod being movable with and in such disposition in relation to said pump and plunger rod that said valve means closes the opening which communicates with the rod interior and the front of the moving plunger so that filtrate in that part of the chamber is forced back through the filtering wall while filtrate in the chamber behind the plunger enters the rod through the uncovered opening and means for displacing said valve rod longitudinally relatively to said hollow rod so as to reverse said valve means and uncover the opening which was previously closed and close that which was previously open, said valve-displacing means being operatively co-ordinated with said plunger displacing means so as to effect said valve movement when the plunger is about at the point of reversal of its motion.

3. Filtering or straining apparatus according to claim 2, in which the valve means are formed by a sleeve member carried by said inner rod.

4. Filtering or straining apparatus according to claim 2, having a rotary driving means and means connecting such rotary means to the hollow plunger rod to translate the rotating motion of the rotary means into rectilinear reciprocatory motion of the rod.

5. Filtering or straining apparatus according to claim 2, having a rotary driving means and means connecting such rotary means to the hollow plunger rod to translate the rotating motion of the rotary means into rectilinear reciprocatory motion of the rod and having rotary cam means co-axial with said rotary driving means and timed to operate said valve rod at about the time of reversal of the plunger movement.

6. Filtering or straining apparatus according to claim 2, having a rotary driving means and means connecting such rotary means to the hollow plunger rod to translate the rotating motion of the rotary means into rectilinear reciprocating motion of the rod and having rotary cam means co-axial with said rotary driving means and arranged to displace the valve rod in one direction at about the time of reversal of the plunger movement and spring means which actuate the rod in the reverse direction, said cam means controlling the action of said spring means so that the latter actuates the rod at about the time of the next reversal of the plunger movement.

7. Filtering or straining apparatus according to claim 1, having a rotary driving means and means connecting such rotary means to the hollow plunger rod to translate the rotary motion of the rotary means into rectilinear reciprocating motion of the hollow rod, and having rotary cam means co-axial with said rotary driving means, said cam means having a quick-acting peripheral part timed to contact the upper portion of the valve rod when this and the plunger are about at the point of reversal of their motions in order to depress the rod relatively to the plunger rod, said rotary cam having a following peripheral part shaped to hold the valve depressed until the plunger and valve rods again reverse, a spring normally tending to raise the rod, said cam being shaped to allow the spring to act and raise the rod at about the time of such next reversal of the plunger and valve rods.

8. A filtering or straining apparatus according to claim 2, having rotary means and a rod connecting said rotary means to said plunger rod to impart reciprocatory motion to said unit.

9. A filtering or straining apparatus according to claim 2, having rotary means, a rod connecting said rotary means to said plunger rod to impart reciprocatory motion to said unit, said valve rod actuating means including a rotary cam which is rotatable with said rotary means and is shaped to impart a longitudinal movement to said valve rod when the said connecting rod is substantially at its dead centre position.

10. A filtering or straining apparatus according to claim 1, in which said hollow cylinder is contained in a receptacle having an inlet for the crude material, said cylinder being situated at such a level in said receptacle as to allow the dross forced off the filtering wall by the returned filtrate to separate out by gravity and settle at a different level from the cylinder.

11. A filtering or straining apparatus according to claim 1, having means forming a delivering chamber around the projecting part of the rod in which said outlet is provided.

WILLIAM JAMES FORREST.
CHARLES HALL BROWN.